United States Patent [19]

Richard, Jr.

[11] 4,171,077
[45] Oct. 16, 1979

[54] BICYCLE CARRIERS FOR BUSES AND THE LIKE

[76] Inventor: J. Berchman Richard, Jr., 5634 Fallbrook Ave., Woodland Hills, Calif. 91364

[21] Appl. No.: 828,619

[22] Filed: Aug. 29, 1977

Related U.S. Application Data

[63] Continuation-in-part of Ser. No. 702,520, Jul. 6, 1976, abandoned.

[51] Int. Cl.² ............................................. B60R 9/10
[52] U.S. Cl. ...................... 224/42.03 B; 224/42.45 R; 211/18; 105/367
[58] Field of Search .................. 224/42.03 B, 42.03 R, 224/29 R, 42.45 R, 42.46 R, 42.42 R; 211/19, 20, 21, 22, 5; 105/367, 463

[56] References Cited

U.S. PATENT DOCUMENTS

| | | | |
|---|---|---|---|
| 586,681 | 7/1897 | Douglas | 211/19 |
| 615,264 | 12/1898 | DuPont | 211/19 |
| 626,535 | 6/1899 | Gradmiller | 211/19 |
| 2,573,275 | 10/1951 | Richey | 224/42.1 CA X |
| 3,176,903 | 4/1965 | Farley | 224/42.03 B |
| 3,757,975 | 9/1973 | Sneider | 224/42.03 B X |
| 3,802,232 | 4/1974 | Mattson et al. | 224/29 R X |
| 3,901,421 | 8/1975 | Kalicki et al. | 224/29 R |
| 3,921,869 | 11/1975 | Rogers | 224/42.03 B |
| 3,994,425 | 11/1976 | Graber | 224/29 R |

*Primary Examiner*—David A. Scherbel
*Assistant Examiner*—Jerold M. Forsberg
*Attorney, Agent, or Firm*—Blakely, Sokoloff, Taylor & Zafman

[57] ABSTRACT

Bicycle carriers for buses and the like which include a locking device for each bicycle so as to allow the loading and removal of bicycles by passengers without requiring the attention of the bus driver. The bicycle carriers are provided with a quick disconnect mechanism for ease in fastening and removal from the bus, in spite of bus to bus variations, and may include retractable wheels in the form of casters providing for easy movement of the carrier when taken off the bus. Each bicycle support is disposed and configured so as to quickly guide a bicycle into the proper carrying position and to require minimum time and physical agility for loading and unloading. An additional pair of tail lights are provided on the carrier frame to avoid the effects of any partial obscuring of the tail lights on the vehicle. Various embodiments are disclosed, including embodiments utilizing coin operated and other locking devices.

10 Claims, 13 Drawing Figures

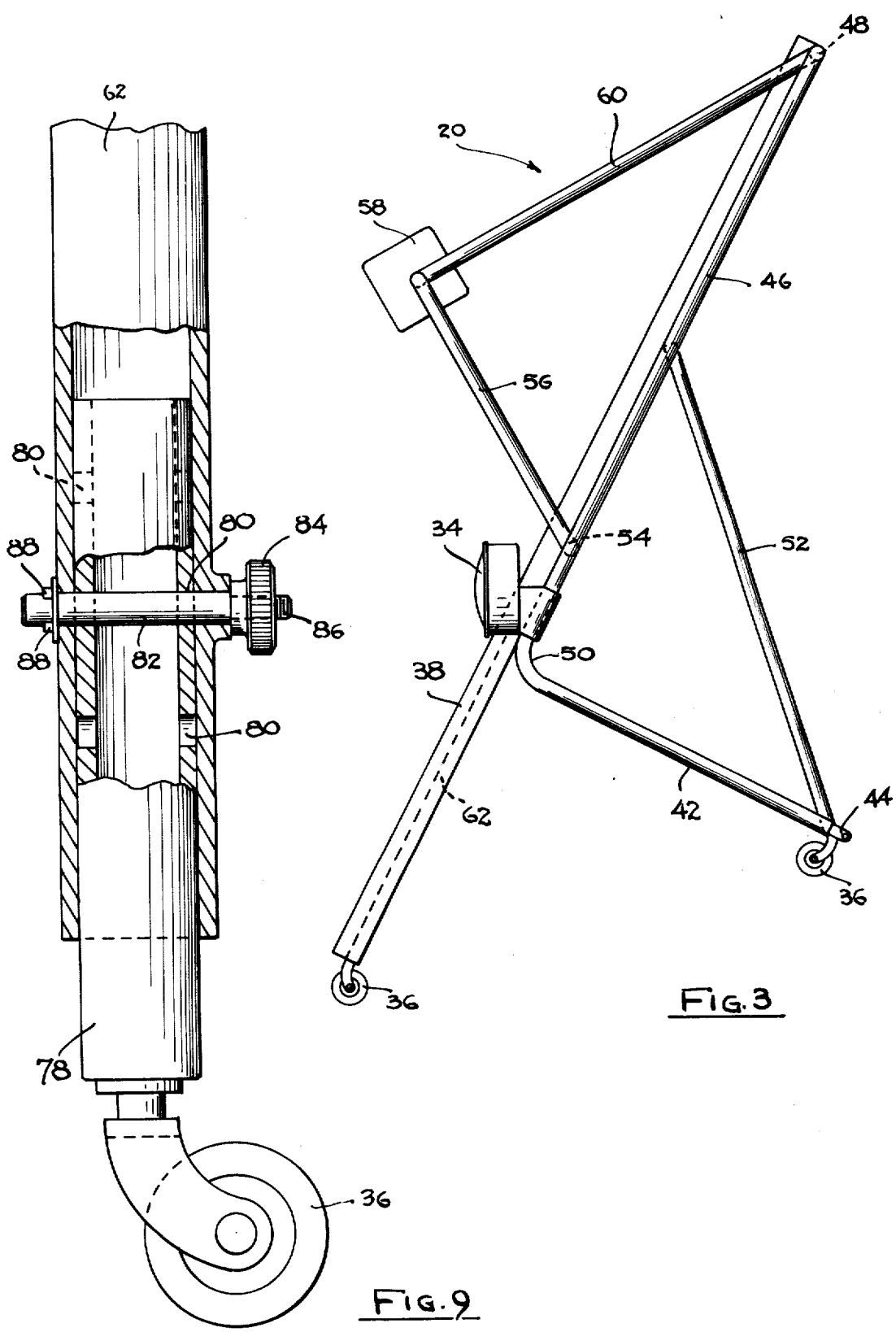

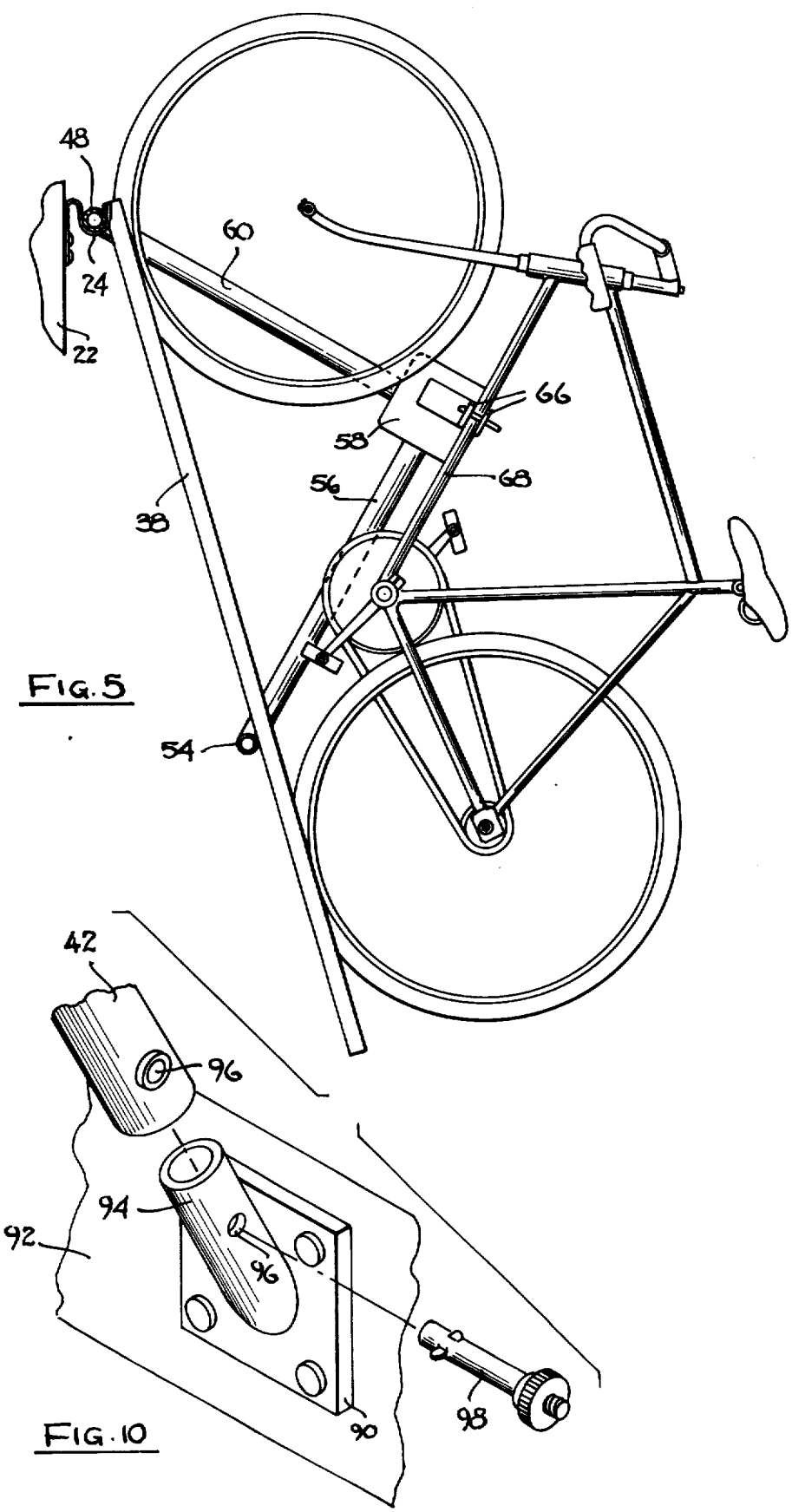

BICYCLE CARRIERS FOR BUSES AND THE LIKE

CROSS REFERENCES TO RELATED APPLICATIONS

This application is a continuation-in-part application of my copending application entitled "Bicycle Carrier for Buses and the Like", filed on July 6, 1976, as Ser. No. 702,520 now abandoned.

BACKGROUND OF THE INVENTION

1. Field of the Invention

The present invention relates to the field of transportation equipment, and more particularly to equipment for carrying bicycles in the assembled state on vehicles such as buses.

2. Prior Art

In recent years there has been a great resurgence in bicycling in the United States particularly with the adult population, both as a form of recreation and as a form of exercise. In response to this interest and other ecology related interests, bicycle trails and paths have been set aside or even constructed anew especially for such activity. Accordingly, there is a frequently encountered need to transport bicycles on vehicles of various kinds.

Bicycle carriers for private automobiles are well known in the prior art. The most popular of such carriers mount to the rear bumper of the automobile and have an upward projecting framework supporting two generally horizontal rearward projecting hooks for receiving one or two bicycles. Typically the bicycle frame is placed on the hooks and the bicycle is tied into position by various means such as an elastic cord, with the entire assembly being stabilized by a strap running from the top of the frame assembly to the forward edge of the trunk lid. Some such bicycle carriers utilize a pair of vertically disposed tube sections fastened to the vehicle bumper, with the upright frame assembly having a slip fit into the tube section so as to allow quick removal for access to the trunk region, etc. when desired.

The foregoing type of bicycle carrier typically carries one or two bicycles in a generally upright orientation perpendicular to the direction of motion of the vehicle. Other types of carriers are also known which hold one or more bicycles in alternate positions. By way of example some bicycle carriers are adapted to mount on the roof of the automobile and to receive a bicycle in the inverted position, e.g., resting on the handle bars and generally aligned with the vehicle axis.

Another form of carrier is shown in U.S. Pat. No. 3,901,421. This type of carrier mounts to the trunk lid of an automobile and holds a plurality of bicycles in the generally upright position aligned with the axis of the vehicle, with the bicycle being retained in position by clamps supported from the frame of the carrier. The bicycles are supported in an approximately horizontal position and must be generally lifted onto the rack, as the lowest portion of the bicycle support members of the rack are approximately even with the upper rear portion of the trunk lid or higher. (Another rack of this same general type is shown in U.S. Pat. No. 3,994,425, with still another rack being shown in U.S. Pat. No. 3,757,975, the latter rack being pivotable to provide trunk access, though even when pivoted down, does not provide a ramp from ground level for easy loading).

At the present time bicycles are sometimes carried on commercial vehicles such as buses, though typically they are carried in an at least partially disassembled state in the baggage compartment of the vehicle. This method of carrying bicycles typically requires not only the partial disassembly of the bicycle but further requires the driver's attention in loading and unloading the bicycles, thereby making it suitable only for long cross country trips, as opposed to short bus trips to the beach or other locations of the bicycle path. One carrier is known for commercial vehicles and is disclosed in U.S. Pat. No. 615,264. This carrier was intended to mount on the end of a street car and to support one bicycle primarily by the front wheel thereof. The carrier has no convenient way of locking the bicycle to the carrier or for extracting a toll for the use thereof, and in fact is intended only for the support of a single bicycle at one end of the street car. The carrier itself is substantially permanently fastened to the street car, and in general is shown as only being used on a surface of the street car which in general does not require access for servicing of an engine, etc. as commonly encountered on modern buses. The support of the bicycle primarily from the front wheel as shown in this patent is undesirable with modern bicycles, as typically such bicycles are adapted for the easy and quick removal of the front wheel, and accordingly the front wheel could be vibrated loose in transport resulting in the loss of the main portion of the bicycle. In that regard, the rack of U.S. Pat. No. 626,535 is similar, in that the support is on the front wheel.

In addition to the foregoing, various types of locks for locking bicycles into some form of bicycle stand are known, including those shown in U.S. Pat. Nos. 3,749,295; 3,802,232 and 3,865,245. Finally, U.S. Pat. No. 3,176,903 shows a carrier very different from the present invention, that carrier including supplementary tail lights.

BRIEF SUMMARY OF THE INVENTION

A bicycle carrier for buses and the like which may include a coin operated locking device for each bicycle so as to allow the loading and removal of bicycles by passengers without requiring the attention of the bus driver. The bicycle carrier is provided with a quick disconnect mechanism for ease in fastening and removal from the bus, and may have retractable wheels in the form of casters providing for easy movement of the carrier when taken off the bus. A unique mounting structure eliminates problems otherwise caused by bus to bus variations. Each bicycle support is disposed and configured so as to quickly guide a bicycle into the proper carrying position and to require minimum time and physical agility for loading and unloading.

In one embodiment, the locking device for securing each bicycle in position on the bicycle carrier is a coin operated locking device of the type wherein a coin is inserted so as to enable the lock to be locked and the key removed therefrom. Subsequent reinsertion and unlocking of the lock results in entrapment and retention of the key in readiness for a subsequent user. Because of the additional overhang created at the rear of the bus due to the bicycle carrier, and perhaps the partial obstruction of the tail lights on the bus, an additional pair of tail lights are provided on the carrier frame. Also, while the preferred embodiment is disclosed with respect to the preferred use on buses, the bicycle carrier of the present invention is readily useable on other vehicles such as motor homes and the like and, for that matter, a perfectly vertical or near vertical mounting surface on the rear of the vehicle on which the carrier is utilized is not required. Obviously, other locks and locking devices may be incorporated, as also disclosed herein.

BRIEF DESCRIPTION OF THE DRAWINGS

FIG. 3 is a side view of the bicycle carrier.

FIG. 5 is a partial cross section of the bicycle carrier illustrating the support brackets on the bus and the locking of the bicycle frame to the carrier.

FIG. 9 is a partial cross section illustrating the structure supporting the casters 36.

FIG. 10 is a perspective exploded view of one of the lower mounting brackets, preferably bolted to the bumper of the bus, and the associated frame and quick disconnect locking member.

DETAILED DESCRIPTION OF THE INVENTION

Figure 1:
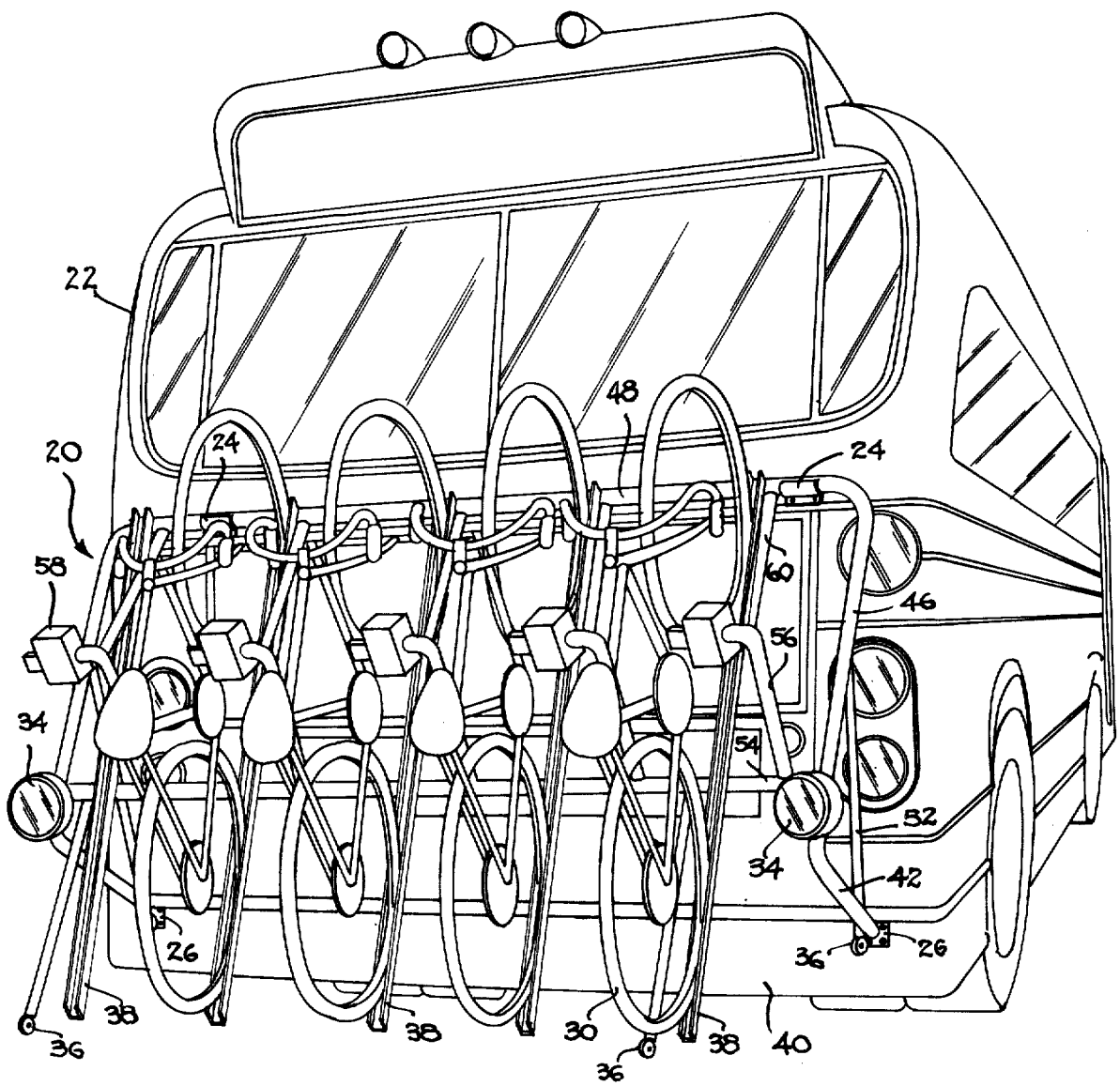
FIG. 1 is a perspective view of the rear of a bus having one embodiment of the present invention bicycle carrier mounted thereon.

First referring to FIG. 1, a perspective view of the rear of a bus having one embodiment of the present invention mounted thereon and carrying a plurality of bicycles may be seen. The bicycle carrier is generally comprised of a frame assembly 20 coupled to the rear of a bus 22 by a pair of clip-like hangars 24 and quick disconnect couplings, generally indicated by the numeral 26. The frame assembly has mounted thereon a plurality of channel members 28, each for receiving a bicycle 30 in the generally upright position aligned with the axis or length of the bus, and with the front wheel elevated to a substantially higher position than the rear wheel. In this embodiment the channel members 28 are inclined so that the bicycles mounted therein are tilted upward at an angle of approximately seventy degrees. The purpose of this tilt, of course, is to foreshorten the entire assembly, including the bicycles mounted thereon, so as to minimize the overhang on the bus and yet to allow the side-by-side disposition of a plurality of bicycles to maximize the number of bicycles which may be carried. Also mounted to the frame assembly are a plurality of lock devices 32, which in this embodiment are disposed so as to engage a frame member of a bicycle so as to positively retain the bicycle in the desired position, and to provide a lock therefor to prevent undesired removal or theft of the bicycle when the bus stops. Also coupled to the frame assembly 20 are an additional pair of taillight assemblies 34 which are wired to the taillight lines on the bus through a quick disconnect coupling so as to offset any visual obstruction of the taillights on the bus and to effectively minimize the bicycle and carrier overhang from these taillights. Also visible in FIG. 1 are casters 36, the function of which will be subsequently described.

It will be noted from FIG. 1 that the lower end 38 of the channel members 28 extends to a position approximately even with the lower edge of the bumper 40 on the bus, and accordingly is on the order of eighteen or twenty inches from the ground. Thus the lower end 38 will intercept the front wheel of a bicycle on the ground and provide an easy and continuous guide for the bicycle wheels into the final position shown in FIG. 1.

In this embodiment the locking devices 32 are coin operated devices of the type wherein the insertion of a coin allows the locking of the devices and the removal of the key therein. Accordingly, because of the ease with which a bicycle may be placed on the carrier, and the fact that the carrier includes a coin operated lock for each bicycle on the carrier, bicycles may readily be loaded and unloaded by a passenger without requiring the physical presence of the driver. Thus the carrier of the present invention may readily be used with city buses on any routes, particularly routes to and from beaches, public parks, areas having bicycle paths, etc., with the automatic extraction of the additional fare required for the carrying of the bicycles, and without requiring the driver to personally physically load and unload the bicycles. (Appropriately placed mirrors on the bus will allow the driver to generally monitor the loading and unloading of bicycles from the driver's seat, and to respond to any attempted vandalism should attempts occur.) In this embodiment the actual locking device may be the locking box of the bicycle locking stand disclosed and described in detail in U.S. Pat. No. 3,802,232 of Mattson, et al, Apr. 9, 1974.

Figure 2:
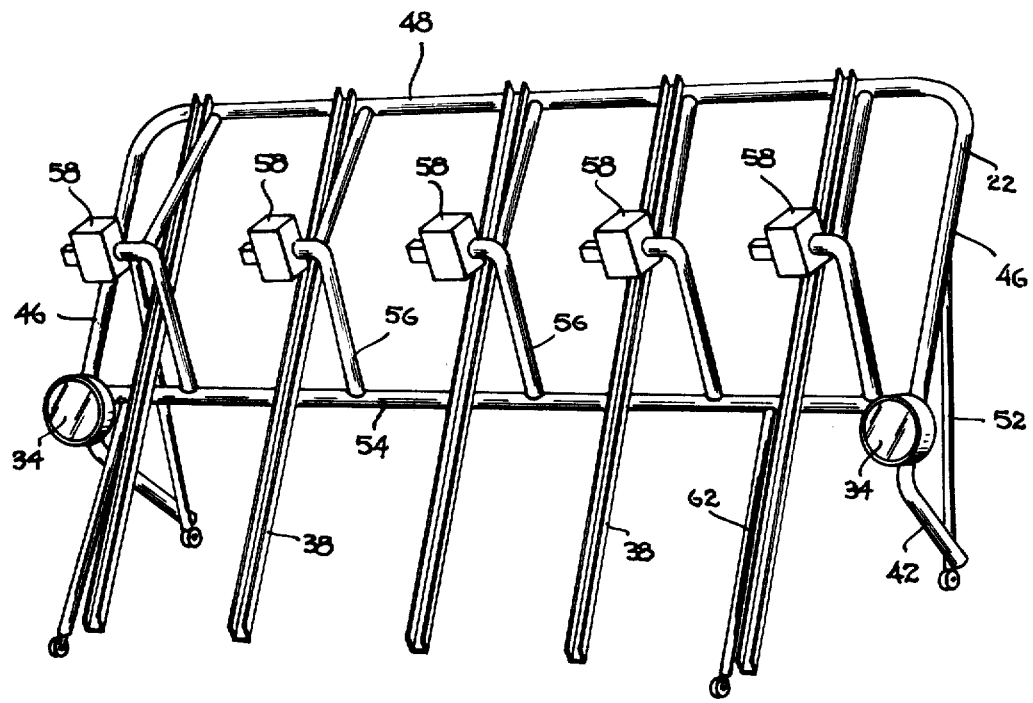
FIG. 2 is a perspective view of the bicycle carrier of FIG. 1.

Now referring to FIGS. 2 and 3, a perspective view and an end view of the bicycle rack of this embodiment of the invention may be seen. The frame assembly 20 is comprised of a main tubular steel member 22 having a lower end section 42 with a hole 44 adjacent the lower end thereof, and an upper tubular section 46 integral with a horizontal frame section 48 joining the two ends of the frame assembly. The taillight assembly 34 is mounted generally at the bend 50 between sections 42 and 46, with additional tubular members 52 being welded between sections 42 and 46 to provide a stiffening web for the frame assembly. Welded to tube sections 46 just above the bend 50 is a second cross bar 54 to which are welded a plurality of steel tube members 56 in spaced-apart disposition, each for supporting a locking box 58 thereon. Strength and stability for the locking box support is also provided by a plurality of stiffening tube members 60 welded to the tops of members 56 and the upper horizontal bar section 48. The channel members 38 are bolted to the cross bars 48 and 54.

Figure 4:
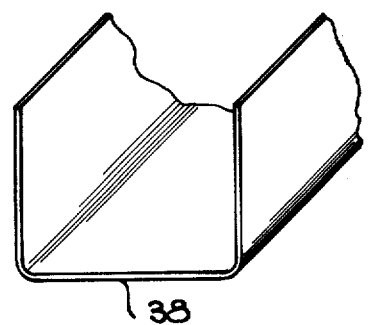
FIG. 4 is a cross section of one of the channel members supporting the bicycle wheels.

Now referring to FIG. 4, a typical cross-section of one of the channel members 38 may be seen. In the preferred embodiment the channel members are formed from aluminum sheet metal, and are characterized by a generally U-shaped cross-section.

Figure 6:
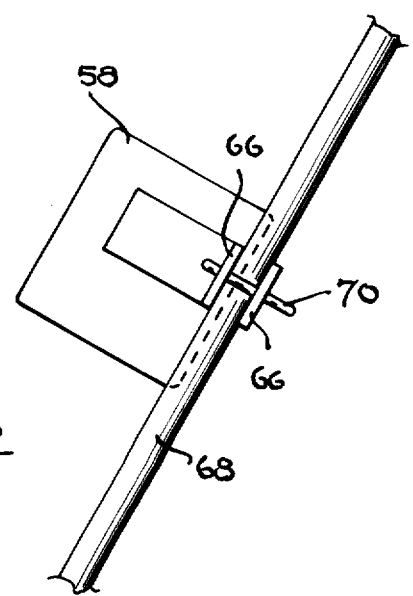
FIG. 6 is a view of a locking box and adjacent bicycle frame of FIG. 5 taken on an expanded scale.

Now referring to FIG. 5, a partial cross section of the bicycle carrier of the present invention, particularly illustrating the upper hanger support for the carrier on the bus and the manner of engagement of the bicycle frame with the locking box, may be seen. Simple heavy sheet metal hangers 24 may be bolted to the rear surface of the bus so as to provide a cradle for the horizontal cross bar 48 of the carrier. As is further illustrated in FIGS. 6 through 8, each locking box 58 has a pair of outward projecting members 66 which extend beyond the midplane of the respective channel member 38. The members 66 are disposed and aligned so as to receive the frame member 68 found on substantially all bicycles, and to cradle the frame member 68 therebetween. If desired, members 66 may be slightly curved so that the normal force of gravity on the bicycle will further encourage the frame member 68 into the space between members 66 for temporary retention of the bicycle before the lock is set. The locking boxes 58 have a J-shaped locking member 70 which may be moved downward through cooperatively disposed holes in members 66 so as to entrap the frame member 68 therebetween (see FIG. 8), with a locking mechanism generally indicated by the numeral 72 locking the J-bar 70 in the hereinbefore described position.

Figure 7:
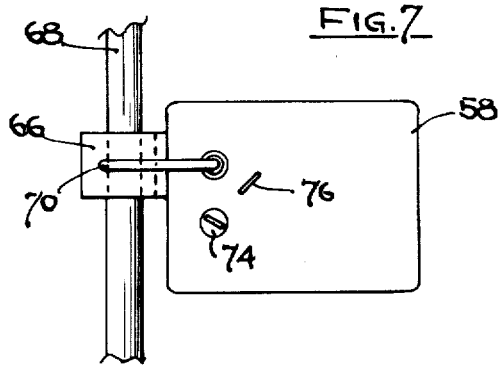
FIGS. 7 and 8 are additional views of the locking box illustrating its engagement of the bicycle frame.
Figure 8:
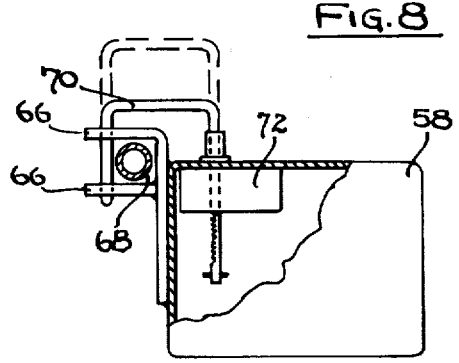

Normally the J-bar is in the upper position shown in phantom in FIG. 8, and a key is retained in the slot 74 (see FIG. 7). However, once a bicycle is placed in position shown in FIG. 5, the J-bar 70 may be lowered to the position shown in FIG. 8, a coin inserted in the coin slot 76 and a key in keyhole 74 turned to lock the J-bar in the lower position, thereby locking the bicycle in place and releasing the key so that the bicycle owner may personally retain the key and board the bus for subsequent unlocking and release of the bicycle (thereby confining the key) at the destination. Of course the locking boxes may be set up to operate on any denomination coin, and the fare extracted for use of the rack through the locking box is separate and apart from the preestablished fare for riding on the bus. While loading and unloading of the carrier by the passenger may take slight additional time, the fare extracted for the use of the carrier could be substantial, as no existing convenient commercial equivalent to the results of the present invention are known or available. In that regard, it should be noted that it is within the scope of the present invention to incorporate a locking box requiring two or more coins, such as two quarters for the operation thereof (if desired, members 66 and a section of a J-bar 70, which preferably is hardened steel, may be coated with plastic to minimize abrasion of the bicycle frame in the region of the lock).

Now referring to FIG. 9, details of the assemblies holding casters 36 may be seen. By way of example, the lower end of one of the tube members 52 is shown in cross section. A smaller tube member 78 having a caster 36 fastened to the bottom thereof slides within the frame tube member 52 and is provided with a plurality of transverse holes 80 therethrough. A similar conveniently disposed transverse hole 82 is provided in tube member 52 with a push-button locking pin 84 being used to lock tube 78 at a particular desired position, e.g., retracted when the carrier is in use on a bus and extended to support the carrier at the normal operating elevation when being removed from the bus. Push-button locking pins such as pin 84 are commercially available locking devices, characterized by a spring-loaded push-button 86 which, until depressed, maintains balls 88 in the opposite end thereof in separation to prevent retraction of the locking pin.

Now referring to FIG. 10, details of quick disconnect couplings, generally indicated by the numeral 26 in FIG. 1, may be seen. A small plate 90 is bolted to the bumper 92 of the bus at each side of the bicycle carrier. The plates 90 have a short tube section 94 welded thereto at an appropriate angle so as to slidably engage the lower end of the frame tube member 42 (see FIGS. 2 and 3). The members 94 and 42 each have cooperatively disposed through-holes 96 therethrough to receive a locking pin 98 similar to the locking pin hereinbefore described with respect to FIG. 9. Accordingly, as a result of the combination of the retractable casters, the simple cradle support for the upper horizontal bar of the bicycle carrier, and the quick disconnect coupling of the lower ends of the carrier frame members to the bus, very quick attachment and removal of the bicycle carrier from a bus may be achieved, thereby allowing quick access to the engine compartment of the bus, should such access be needed, and allowing the quick removal of the carrier from one bus and attachment to another bus. Of course, if desired, various types of locks could be used to lock a bicycle carrier onto the bus, such as key locking devices and combination locking devices. However, unless the buses are to be left overnight in unsecure areas, such locks are generally not necessary. The individual bicycles, of course are locked in position with a high integrity locking device so that theft of an individual bicycle is prevented. Theft of the entire rack in normal useage, however, does not occur because of the size and weight of the assembly.

The present invention bicycle carrier has a number of very substantial advantages over the prior art methods of transporting bicycles on commercial vehicles. The bicycle need not be disassembled in any manner for transport. The bicycles are loaded and unloaded by the passenger without requiring the efforts of the bus driver. The additional fare for the use of the bicycle rack is automatically extracted without requiring the driver's specific identification of a user, or the personal collection of any additional fee. No trailer, enclosed compartment, or roof top carrying is utilized, all of which have their own specific disadvantages. The bicycles are carried in a normal upright position, but with the front wheel elevated so as to incline the bicycle at approximately seventy degrees, thereby foreshortening the horizontal length required to accommodate the bicycles to minimize the overhang at the rear of the bus. The entire carrier may be made sufficiently light so as to not significantly affect the overall weight of the vehicle, and may be very quickly removed from the bus and easily wheeled about the yard when desired. Accordingly, maximum utilization of bicycle trails, typically constructed or set aside at great expense, may be achieved through the use of the present invention, since the present invention effectively makes any given bicycle trail accessible to persons scattered over much larger areas. In addition, there is a very substantial safety factor with respect to the use of the present invention, as it provides an alternative, and thereby discourages, the riding of bicycles on busy streets, etc., by providing a more convenient and speedy means of transporting the person and the bicycle to the desired area.

Figure 11:
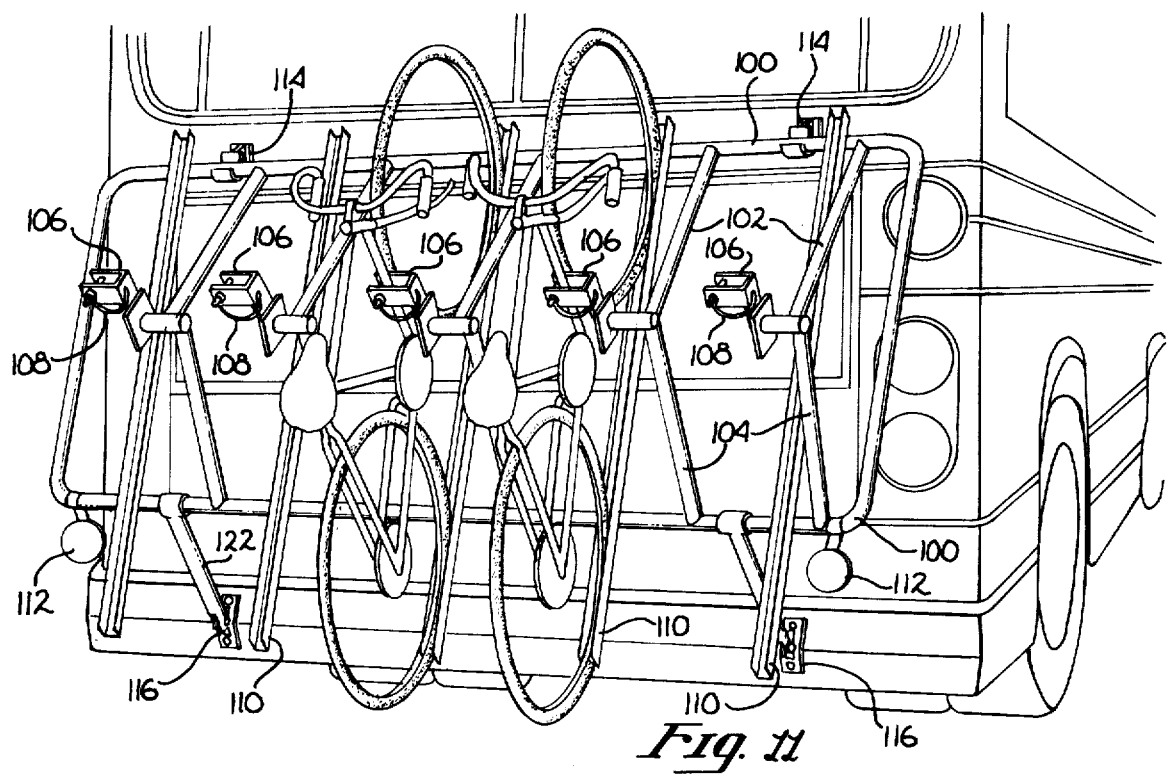
FIG. 11 is a perspective of the rear of a bus having another embodiment of the present invention bicycle carrier mounted thereon.

Now referring to FIG. 11, an alternate embodiment of the present invention may be seen. A tubular frame member 100 supports a plurality of tubular members 102 and 104, each pair of which supports a channel member 106 for receiving and retaining the downtube of a bicycle. The channel members 106 may be of any suitable form having a provision for receiving a retaining device, such as in the preferred embodiment a push button locking member of the general type of locking member 98 (see FIG. 10) fastened to the carrier by chains 108 so as to be movable between retaining and open position, but not separable from the carrier itself. Thus, the bicycles may be retained in the channel members 106 with the wheels being received and guided to the final mounting position by the channel members 110. As before, a separate set of tail lights 112 is coupled to the tubular frame 100 so as to avoid any problems caused by any obstruction of the tail lights of the bus itself.

In a manner similar to that of the first embodiment, the tubular frame 100 is supported from above by a pair of hook-like hangers 114 which may be fastened to the back of the bus at the appropriate elevation. The specific hangers used with this embodiment actually space the upper bar of frame 100 somewhat away from the back surface of the bus to accommodate any curvature in the back surface of the bus and/or protrusion such as screw and rivet heads etc. Further, it will be noted that the use of simple hangers as before, not only makes the mounting of the bicycle carrier easy, but also renders the spacing of the hangers 114 with respect to each other relatively non-critical.

The lower portion of the tubular frame 100 is supported, preferably from the vehicle bumper, by mounting brackets 116 bolted to the bumper, the mounting brackets having a vertically disposed flat plate 118 fastened thereto with a transverse hole through the plate receiving a locking pin 120 passing through the slotted lower portion of tubular mounting members 122. The upper end of the tubular mounting member 122 is welded to a short transverse tube section 124 having a slip fit over the lower tubular frame member 100. This mounting means or the equivalent thereof is extremely important to the present invention, as it eliminates the criticality in the mounting of members 114 and 116 to the back of the bus, making the installation of these members a relatively simple procedure, and providing quick interchangability of bicycle carriers between buses without having to worry about carrier-to-carrier and bus-to-bus variations. In particular, because of the slip fit of the short transverse tubular member 124 on the lower horizontal bar of frame member 100 and the lack of obstruction of member 100 in the region of the normal positioning of members 124 thereon, variations in the spacing of the mounting brackets 116 from bus-to-bus may very readily be accommodated by simply sliding members 122 closer together or further apart as required. This allows the mounting of mounting brackets 116 to the bumper of the bus using pre-existing bolt holes in the bumper without requiring a custom fit of the particular carrier. Further, since the lower end of members 122 are effectively pivotally mounted to the mounting brackets 116, and of course are pivotally mounted at their upper end to the lower portion of tubular frame member 100, the vertical spacing between the mounting brackets 116 and the hangers 114 is also made non-critical, thereby totally eliminating the need for any custom matching of bicycle carriers to buses, and making the carriers automatically interchangable between buses.

Figures 12, 13:
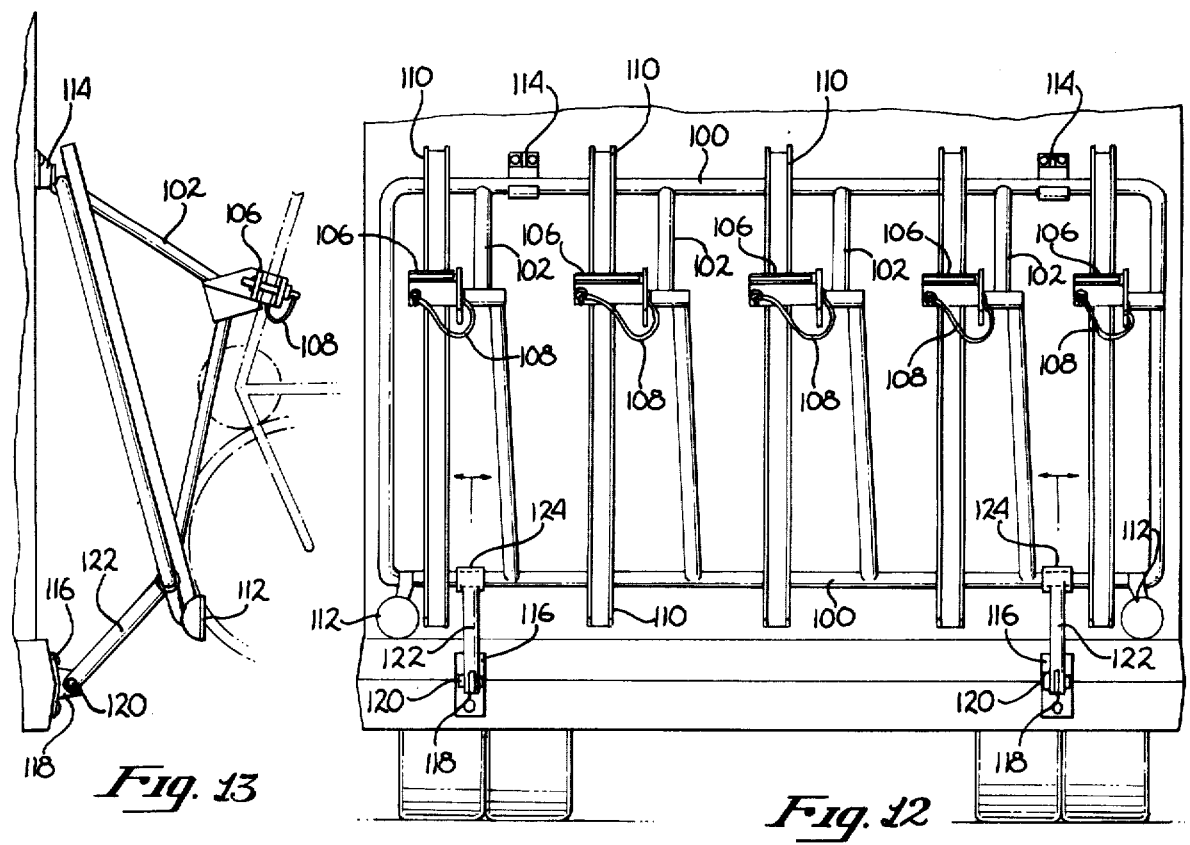
FIG. 12 is a rear view of the bus and carrier of FIG. 11.
FIG. 13 is a side view of the corner and rear portion of the bus of FIGS. 11 and 12.

The net effect of the embodiment disclosed with respect to FIGS. 11 and 13 is that simple mounting brackets may be coupled to the bumpers of existing buses using bolt hole patterns already in the bumpers, and without the need for drilling any additional mounting holes. Further, the upper hangers 114 may be quickly mounted to the bus, either using existing bolt holes or by drilling appropriate mounting holes quickly and easily laid out for each bus using a tape measure without worrying about the exact location thereof. In fact, the nominal separation between hangers 116 may vary from bus to bus in accordance with bus-to-bus variations (year and model variations, etc.) Similarly, the separation between the upper hangers 114 may also vary as appropriate or needed to accommodate various buses. Further, even the vertical separation between the upper hangers 114 and the lower mounting members 116 may be varied, yet the single design bus carrier of this embodiment will be interchangable between buses in spite of all of the foregoing variations. The advantage of such a universal mounting cannot be overstated, as easy installation and removal and interchangability between buses has a very substantial effect on the commercial application of the carrier.

It will be noted that the embodiment of FIGS. 11 through 13 does not included retractable casters or similar devices for the roller of the carrier when off of a bus. This particular embodiment however, is particularly simple and light so as to be so easily handled by two persons.

While specific embodiments of the present invention have been disclosed and described in detail herein, it will be understood by those skilled in the art that various changes in form and detail may be made therein without departing from the spirit and scope of the invention.

I claim:

1. A bicycle carrier for buses and similar vehicles comprising:

a frame assembly;

a plurality of channel members coupled to said frame assembly, said channel members being disposed in spaced apart disposition across the width of said frame assembly, each to receive a bicycle in the upright position aligned with the axis of the bus and to guide the bicycle to a position with the front wheel substantially elevated with respect to the rear wheel of the bicycle;

lock means for locking each bicycle to the bicycle carrier; and means for coupling said frame assembly to the rear of a vehicle, said means adaptable to variations in size of said vehicle; and wherein the upper portion of said frame assembly includes at least one upper horizontal bar adjacent the rear of the vehicle, and said means for coupling said frame assembly to the rear of the vehicle includes at least one hook-like member attached to said rear of said vehicle and forming a cradle on which said horizontal bar may rest, the lower portion of said frame assembly includes a lower horizontal bar and said means for coupling said frame assembly further includes at least one elongated member, a first end of said member provided with means for pivotal attachment to said lower horizontal bar and the second end of said member coupled to a lower portion of the back of such vehicle, said second end of said elongated member is pivotally mounted to a bracket member affixed to the lower portion of the rear of the vehicle, and said means for pivotal attachment of said first end of said member to said lower bar includes slide means to allow the location of said attachment of said first end to be varied along a portion of said lower horizontal bar;

whereby said carrier may be fitted to buses and similar vehicles of various sizes.

2. The bicycle carrier of claim 1 wherein said elongated member is a tubular member, and said means for pivotal attachment of said first end of said tubular member comprises a short transverse tube member attached to said first end and having a slip fit over said lower horizontal bar.

3. The bicycle carrier of claim 1 wherein said hook-like member spaces said upper horizontal bar away from the back surface of the bus to accommodate any curvatures in or protrusions from said surface.

4. The bicycle carrier of claim 1 further comprised of a pair of tail lights on said frame assembly.

5. The bicycle carrier of claim 1 wherein said lock means is a coin operated lock means for locking the frame of bicycles to said bicycle carrier.

6. The bicycle carrier of claim 1 wherein each of said channel members projects downward to intercept a bicycle wheel as a bicycle is rolled toward said channel members to guide said bicycle wheel upward into said channel member.

7. The bicycle carrier of claim 1 wherein said channel members are in parallel spaced apart relationship.

8. The bicycle carrier of claim 1 wherein said means for fastening said frame assembly to the rear of a bus is a quick disconnect fastening means.

9. The bicycle carrier of claim 1 further comprised of a retractable wheel means mounted to said frame assembly for supporting said bicycle carrier on removal from a bus.

10. A bicycle carrier for buses and similar vehicles comprising:

a frame assembly including an upper horizonal bar adjacent the rear of the vehicle, and a lower horizontal bar;

means for fastening said frame assembly to the rear of the vehicle including at least one hook-like member fastened to the rear of the vehicle and forming a cradle on which said upper bar may rest; and at least one tubular member having a first end pivotally coupled to said lower horizontal bar and slidable along a portion thereof, said tubular member having a second end pivotally coupled to a lower portion of the rear of said vehicle;

a plurality of channel members coupled to said frame assembly, said channel members being disposed in spaced apart disposition across the width of said frame assembly each to receive a bicycle in the upright position aligned with the axis of the bus and to guide the bicycle to a position with the front wheel substantially elevated with respect to the rear wheel of the bicycle; and lock means for locking each bicycle to the bike carrier.

* * * * *